US011426854B2

(12) United States Patent
Lauciello et al.

(10) Patent No.: US 11,426,854 B2
(45) Date of Patent: Aug. 30, 2022

(54) WORK TOOL WITH MOTOR AND FAN

(71) Applicant: EMAK S.P.A., Bagnolo in Piano (IT)

(72) Inventors: Antonio Lauciello, Reggio Emilia (IT); Lorenzo Castellari, Montecchio Emilia (IT); Vincenzo Gagliardi, Modena (IT)

(73) Assignee: EMAK S.P.A., Bagnolo in Piano (IT)

( * ) Notice: Subject to any disclaimer, the term of this patent is extended or adjusted under 35 U.S.C. 154(b) by 281 days.

(21) Appl. No.: 16/771,119

(22) PCT Filed: Nov. 12, 2018

(86) PCT No.: PCT/IB2018/058855
§ 371 (c)(1),
(2) Date: Jun. 9, 2020

(87) PCT Pub. No.: WO2019/116120
PCT Pub. Date: Jun. 20, 2019

(65) Prior Publication Data
US 2021/0170565 A1 Jun. 10, 2021

(30) Foreign Application Priority Data
Dec. 11, 2017 (IT) .......................... 102017000142335

(51) Int. Cl.
B25F 5/00 (2006.01)
A01D 34/78 (2006.01)
H02K 5/20 (2006.01)
H02K 7/116 (2006.01)
H02K 7/14 (2006.01)
(Continued)

(52) U.S. Cl.
CPC .............. B25F 5/008 (2013.01); A01D 34/78 (2013.01); H02K 5/207 (2021.01); H02K 7/116 (2013.01); H02K 7/145 (2013.01); H02K 9/06 (2013.01); A01D 34/416 (2013.01); A01D 34/84 (2013.01); A01D 34/90 (2013.01)

(58) Field of Classification Search
CPC ........ A01D 34/78; A01D 34/90; A01D 34/84; A01D 34/416; H02K 7/116; H02K 7/145; H02K 5/207; H02K 9/06; B25F 5/008
USPC ....................................................... 173/217
See application file for complete search history.

(56) References Cited

U.S. PATENT DOCUMENTS

| 9,379,596 | B2 | 6/2016 | Kraetzig | |
| 2012/0201705 | A1* | 8/2012 | Spaggiari | F04D 29/263 417/423.14 |
| 2014/0219835 | A1* | 8/2014 | De Filippis | F04D 29/5806 417/366 |

FOREIGN PATENT DOCUMENTS

| CN | 105359700 A | * | 3/2016 |
| CN | 105359702 A | * | 3/2016 |

(Continued)

Primary Examiner — Alex W Mok
(74) Attorney, Agent, or Firm — Volpe Koenig

(57) ABSTRACT

Described herein is a work tool (100) comprising: a motor (125) provided with a drive shaft (130), a casing (195) containing the motor (125) and provided with at least one inlet opening (235) and with at least one outlet opening (240), an implement (135) positioned outside the casing (195) and kinematically connected with the drive shaft (130), and a fan (245) kinematically connected to the drive shaft (130) and able to generate a flow of air from the inlet opening (235) towards the outlet opening (240) of the casing (195) passing in heat exchange relationship with the motor (125), wherein said fan (245) is contained inside the casing (195) in a space located between the motor (125) and the implement (135).

9 Claims, 3 Drawing Sheets

(51) Int. Cl.
*H02K 9/06* (2006.01)
*A01D 34/416* (2006.01)
*A01D 34/84* (2006.01)
*A01D 34/90* (2006.01)

(56) References Cited

FOREIGN PATENT DOCUMENTS

| | | | |
|---|---|---|---|
| CN | 106034537 A | * | 10/2016 |
| CN | 106948995 A | * | 7/2017 |
| DE | 1122405 B | | 1/1962 |
| DE | 20316737 U1 | | 12/2003 |
| DE | 102012007405 A1 | | 10/2013 |
| DE | 202016006000 U1 | | 11/2016 |
| JP | H0662637 A | | 3/1994 |
| WO | 2011039978 A2 | | 4/2011 |
| WO | 2013062457 A1 | | 5/2013 |

* cited by examiner

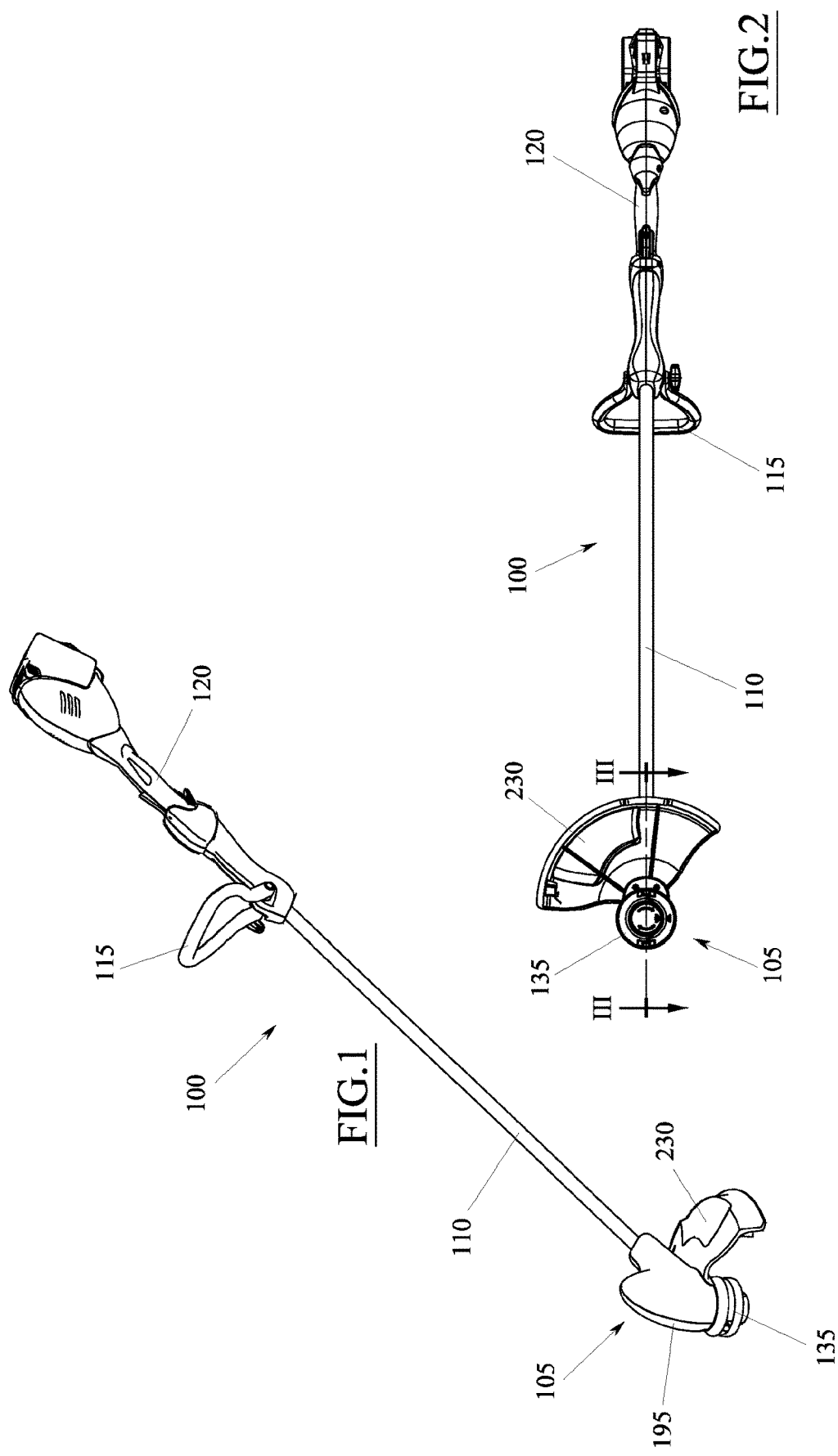

WORK TOOL WITH MOTOR AND FAN

FIELD OF THE INVENTION

The present invention relates to work tools and, in particular, to portable work tools such as those that are commonly used to perform gardening work, such as lawn mowers, brush cutters, hedge trimmers and the like.

PRIOR ART

As is well known, the aforementioned work tools generally comprise a motor, for example an electric motor or a small internal combustion engine, which is provided with a drive shaft to drive a tool, for example a cutting tool which is brought in contact with grass or with the bushes to be cut.

The motor is normally enclosed and protected within a dedicated casing, which comprises a plurality of openings to allow the cooling of the motor during its operation.

To improve this cooling, many work tools also comprise a fan that, driven by the drive shaft, is able to create a flow of forced air inside the casing.

In particular, the rotation of the fan, together with the internal conformation of the casing, enables to draw air in from one or more inlet openings and to thrust is towards one or more outlet openings, after making it follow a path along which the air traverses, laps or otherwise passes in heat exchange relationship with the motor.

In most work tools, the outlet openings are positioned in the upper part of the casing, i.e. in the substantially opposite part with respect to the tool, so that the hot air coming from the motor is discharged substantially upwards.

In other work tools, the outlet openings are, however, positioned in the lower part of the casing, substantially facing the tool, so that the air discharged downwards.

This solution is sometimes preferable because the air projected downwards and on the tool is not inconveniencing for operators and, at the same time, it has the effect of preventing, or at least of contrasting, the entry of grass clippings or of other contaminants into the casing.

Some drawbacks of this solution, however, originate from the fact that the fan that generates the air flow remains located above the motor, i.e. at the opposite part with respect to the tool.

This arrangement entails that the fan is relatively far from the outlet openings and that, immediately downstream of the fan, the air must be immediately deflected downwards, dissipating most of the energy accumulated previously.

All together, these factors thus cause rather significant pressure drops, with a significant reduction in the energy efficiency of the fan which often translates into higher consumption and into the need to adopt rather large fans.

DESCRIPTION OF THE INVENTION

In light of the above, an objective of the present invention is to solve, or at least to reduce, the aforementioned drawbacks of the prior art, within the scope of a simple, rational solution with relatively low cost.

This and other purposes are achieved thanks to the characteristics of the invention as set out in independent claim 1. The dependent claims outline preferred and/or particularly advantageous aspects of the invention.

In particular, one embodiment of the present invention provides a work tool comprising:
 a motor provided with a drive shaft,
 a casing containing the motor and provided with at least one inlet opening and at least one outlet opening,
 a tool positioned outside the casing and kinematically connected to the drive shaft, and
 a fan kinematically connected to the drive shaft and adapted to generate a flow of air from the inlet opening towards the outlet opening of the casing passing in heat exchange relationship with the motor, wherein said fan is contained inside the casing in a space located between the motor and the tool.

Thanks to this solution, the fan is positioned in the lower part of the casing, i.e. in the same part as the tool, and it is therefore able to discharge the air flow downwards with greater efficiency than prior art solutions.

In addition, being contained inside the casing, the fan is advantageously protected with respect to the outside contaminants that otherwise could damage it or hinder its operation.

According to an aspect of the invention, the fan can be an axial fan, i.e. a fan shaped to generate a flow of air that flows in a direction parallel to the axis of rotation of the fan.

This solution allows to thrust the flow of air towards the outlet opening with greater precision.

According to another aspect of the invention, the fan can have its axis of rotation parallel to the drive shaft.

In this way, the size of the fan along the direction of the drive shaft is quite small, allowing to position it in a restricted space and hence to reduce the overall dimensions of the casing.

According to another aspect of the invention, the axis of rotation of the fan can be parallel to an axis of rotation of the tool, for example coinciding therewith.

Thanks to this solution it is advantageously possible to simplify the mechanical connection between the drive shaft, the fan and the tool.

According to an additional aspect of the invention, the outlet opening of the casing can face the tool.

In this way, the flow of air exiting the protecting casing can impact the tool directly, preventing or at least contrasting the entry of contaminants into the casing.

According to another aspect of the invention, the fan can face the outlet opening of the casing.

Thanks to this solution it is advantageously possible to reduce the pressure drops which the air undergoes downstream of the fan.

According to a different aspect of the invention, the work tool can comprise a transmission adapted to connect kinematically the drive shaft to the tool.

In this way, it is possible to uncouple the position of the tool from that of the motor and it is also possible to uncouple the speed of the tool from that of the drive shaft.

For example, the transmission can comprise a toothed pinion coaxially fixed to the drive shaft and a gear wheel coaxially fixed to an output drive shaft and meshing with said toothed pinion.

Thanks to this solution, the transmission is constructively simple and effective.

According to an aspect of the invention, the fan can be kinematically connected to the drive shaft through the transmission.

In this way, with a single kinematic chain it is advantageously possible to drive both the tool and the fan.

For example, the fan can be coaxially fixed to the outlet shaft of the transmission.

Thanks to this solution, the transmission is extremely simple and small sized.

According to a particular aspect of the invention, the fan can be axially interposed between the gear wheel of the transmission and the tool.

In this way, the fan also serves as a protective element for the gears that make up the transmission.

According to a further aspect of the invention, the fan can be constructed in a single body with the gear wheel of the transmission.

Thanks to this solution, a single component is in fact obtained, in which both the gear wheel and the fan are advantageously integrated, within a construction that is compact and simple to assemble.

According to an aspect of the invention, moreover, the gear wheel of the transmission can be a gear wheel with inner teeth.

This solution has the advantage of making the transmission more compact reducing its dimensions.

In this context, the outer diameter of the gear wheel can be equal to or greater than the outer diameter of the fan.

In this way, the fan is substantially contained inside the gear wheel, contributing to reducing the dimensions of the assembly formed by the fan and by the transmission.

According to a different aspect of the invention, the motor can be an electric motor, for example a direct current electric motor.

Thanks to this solution, the operation of the tool and of the fan is extremely simple and easily controllable and does not entail the emission of harmful gases.

According to an aspect of the invention, in particular, the motor can comprise a rotor coaxially fixed to the drive shaft, a stator placed around the rotor and a motor body containing the rotor and the stator.

In this way, the motor is a separate component that can be mounted inside the casing of the work tool as a whole, in a very simple and quick manner.

In this context, according to an aspect of the invention the motor body can comprise at least one inlet port and at least one outlet port for the air flow generated by the fan.

Thanks to this solution, the air that flows inside the casing of the work tool can also penetrate inside the motor body, cooling both the rotor and the stator more effectively.

In particular, the inlet port and the outlet port can be positioned at opposite parts of the stator along the direction defined by the drive shaft.

In this way, the air that enters into the motor body, before reaching the outlet port, is forced to lap the stator and correspondingly also the rotor over their entire extension, improving their cooling.

According to an aspect of the invention, the inlet port can be realised on a head of the motor body oriented towards the tool.

Thanks to this solution, the air that traverses the motor body is forced to flow from the bottom upwards.

According to a further aspect of the invention, the outlet port can be obtained on a lateral wall of the motor body.

In this way, the air that exits from the motor body is directed laterally relative thereto.

According to an aspect of the invention, the motor can comprise a commutator, for example a brush commutator, contained inside the motor body.

Thanks to this solution, the motor body is effectively able to protect also the commutator that is necessary for the operation of the motor.

In this context, the outlet port of the motor body can be positioned between the stator and the commutator.

In this way, the cooling air flow that traverses the motor body does not traverse the commutator, but is deflected outside the motor body before reaching it.

According to an additional aspect of the invention, the motor can comprise an auxiliary fan positioned inside the motor body and coaxially fixed to the drive shaft.

Thanks to this auxiliary fan, it is advantageously possible to increase and sustain the air flow that traverses the motor body, improving the cooling of the internal components.

According to an aspect of the invention, the auxiliary fan can be a centrifugal fan, i.e. a fan able to project air in radial direction relative to the axis of rotation of the fan itself.

In this way, the auxiliary fan is effectively able to change direction to the air flow that traverses the motor body.

For example, the auxiliary fan can be radially facing the outlet port of the motor body.

Thanks to this solution, all the air that reaches the auxiliary fan is immediately deflected and discharged outside the motor body.

According to an aspect of the invention, the auxiliary fan can be axially interposed between the rotor and the commutator.

It is thereby assured that the air that travels through the body of the motor cannot traverse the commutator.

BRIEF DESCRIPTION OF THE DRAWINGS

Further features and advantages of the invention shall become readily apparent from reading the following description provided by way of non-limiting indication, with the aid of the figures illustrated in the accompanying drawings.

FIG. 1 is an axonometric view of a work tool according to an embodiment of the present invention.

FIG. 2 is a bottom view of the tool of FIG. 1.

DETAILED DESCRIPTION

Figure 3:
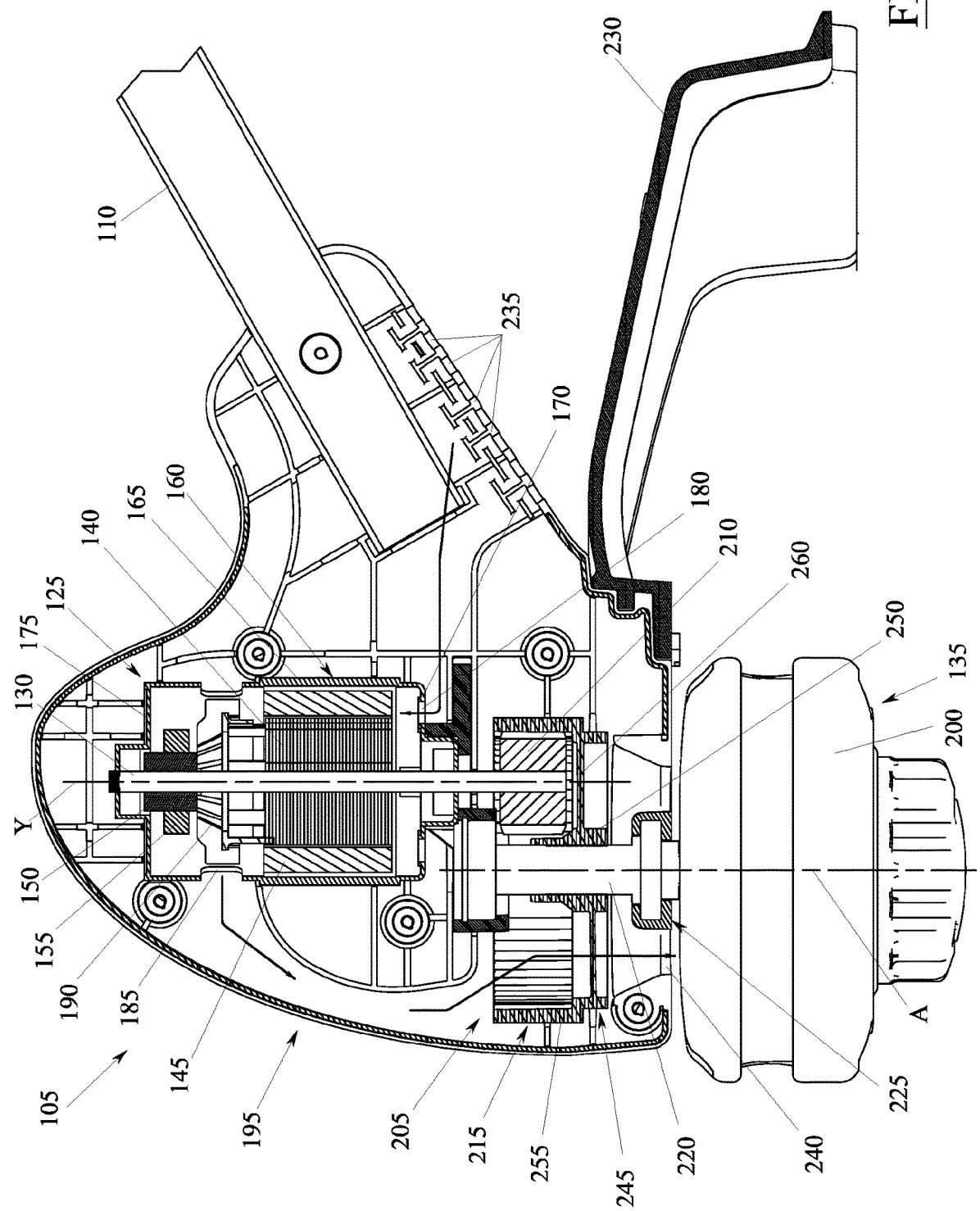
FIG. 3 is the section III-III indicated in FIG. 2 and shown in enlarged scale.
Figure 4:
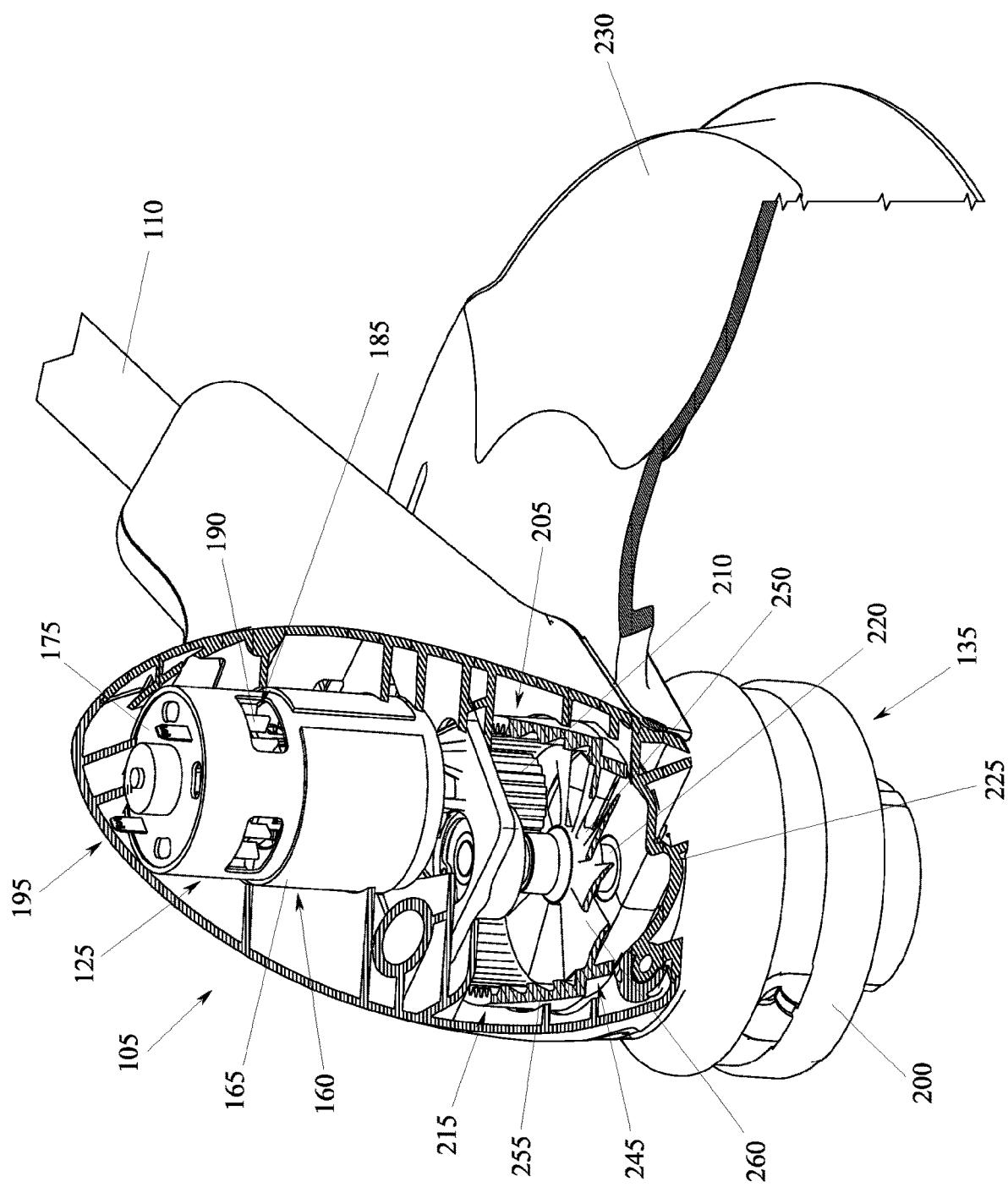
FIG. 4 is a detail of FIG. 1 shown in enlarged scale and partially sectioned to show the internal components.

The present description relates to a work tool 100, typically a portable work tool, for example of the type of those that are commonly used to perform gardening work.

In the illustrated example, the work tool 100 is a brush cutter, i.e. a tool that is hand-carried by a user and typically used to mow lawns or cut hedges.

However, the aspects of the present description may be applied to other work tools, for example lawn mowers, hedge trimmers or the like.

The work tool 100 comprises an operating unit, globally indicated with the numeral 105, which can be mounted at the end of a support rod 110 provided, for example at the opposite end, with a handle 115 and with a grip 120 that enable the user to pick up the work tool 100.

The support rod 110 can be adjustable in length and, at the grip 120, can be provided with a series of controls to control the operation of the operating unit 105.

During normal use, the user, standing in the erect position, grips the handle 115 and the grip 120, so as to incline the support rod 110 downwards and to bring the operating unit 105 in proximity to the ground.

The concepts of "lower/upper", "top/bottom", "horizontal/vertical", which will occasionally be used in the remainder of the description are to be construed with reference to this configuration of normal use.

As shown in FIG. 3, the operating unit 105 essentially comprises a motor 125 having a drive shaft 130, and a tool 135 kinematically connected to the drive shaft 130, in such a way that it can be driven in motion by the motor 125.

The motor 125 is preferably an electric motor, for example a direct-current electric motor, which generally comprises a rotor 140 coaxially and integrally fixed to the drive shaft 130 and a stator 145 that surrounds the rotor 140.

The stator 145 can comprise permanent magnets able to generate a fixed magnetic field, while the rotor 140 can comprise electrical windings able to be travelled by current, in such a way as to generate an induced magnetic field that, interacting with the fixed magnetic field of the stator 145, causes the rotation of the rotor 140, and therewith of the drive shaft 130, around its own axis Y.

To allow this operation, the motor 125 can comprise a commutator 150 provided with brushes 155, which is able to cyclically reverse, during rotation, the direction of the electric current that travels through the windings of the stator 145.

The commutator 150 can be positioned coaxially with respect to the drive shaft 130 and to the side, i.e. axially offset, with respect to the assembly formed by the stator 145 and by the rotor 140.

The rotor 140, the stator 145 and any commutator 150 can be contained inside a motor body 160, which generally comprises a lateral wall 165, for example with substantially cylindrically shape, which winds and coaxially surrounds the stator 145 and any commutator 150, and two heads able to close the axial ends of said lateral wall 165, of which a first head 170 and a second head 175.

The lateral wall 165 and the first head 170 can be realised as a single body having substantially the shape of a tumbler, while the second head 175 can be realised as a lid that closes the mouth of said tumbler.

The rotor 140 and the stator 145 can be positioned inside the motor body 160 in proximal position to the first header 170, while any commutator 150 can be positioned proximally to the second header 175.

The drive shaft 130 is rotatably supported inside the motor body 160, from which it projects outwards through at least one opening obtained in the first head 170, i.e. preferably at the opposite part with respect to the one where any commutator 150 is located.

The motor body 160 can be provided with one or more inlet ports 180 and with one or more outlet ports 185, which are able to put the inner volume of the motor body 160 in communication with the exterior, so as to allow an air flow to traverse the motor body 160 and hence to cool the rotor 140 and the stator 145.

To improve the effectiveness of this cooling, the inlet port(s) 180 and the outlet port(s) 185 can be mutually positioned at opposite parts of the stator 145, relative to the direction defined by the axis Y of the drive shaft 130.

In particular, it can be preferable that, with respect to the direction defined by the axis Y of the drive shaft 130, the outlet port(s) 185 are positioned between the stator 145 and any commutator 150, so that the latter is not traversed by the air flow.

For example, the inlet port(s) 180 can be obtained in the first head 170 of the motor body 160, while the outlet port(s) 185 can be obtained in the lateral wall 165, preferably arranged radially relative to the axis of the drive shaft 130.

To create the aforementioned cooling air flow, the motor 125 can comprise a fan 190, which is contained inside the motor body 160 where it can be coaxially and securely fixed to the drive shaft 130.

In particular, it is preferable for said fan 190 to be a centrifugal fan and to be positioned substantially at the same axial height, relative to the axis Y of the drive shaft 130, whereat are also positioned the outlet port(s) 185, so as to be at least partially facing the outlet port(s) in the radial direction.

For example, the fan 190 can be axially interposed between the rotor 140 and any commutator 150.

The motor 125 is globally contained inside a casing, indicated in its entirety by the numeral 195, which can be fixed at the end of the support rod 110.

The casing 195 can be realised by two or more shells, each of which can be made of plastic material, for example by means of an injection moulding process, and which are mutually joined together, for example by means of screws.

Inside the casing 195, the motor 125 is preferably positioned so that the first head 170 of the motor body 160, i.e. the one from which the drive shaft 130 project, is oriented towards the tool 135.

For example, the motor 125 can be positioned so that the first head 170 is oriented downwards and the axis Y of the drive shaft 130 is substantially vertical.

The tool 135 is positioned outside the casing 195, for example below the motor 125, and it can be kinematically connected to the drive shaft 130 in such a way as to be set in rotation around an axis of rotation A that is preferably parallel to the axis Y of the drive shaft 130.

For example, the tool 135 can be a cutting tool and can comprise a central body 200 that bears a plurality of flexible cutting filaments (not shown because they are known in themselves), which project radially from the central body 200 outwards.

In more detail, the tool 135 can be kinematically connected to the drive shaft 130 through a transmission, indicated in its entirety with the numeral 205, which can define a transmission ratio different from 1 between the drive shaft 130 and the tool 135.

For example, the transmission 205 can be able to define a speed reduction between the drive shaft 130 and the tool 135.

The transmission 205 can comprise a toothed pinion 210 coaxially and securely fixed to the drive shaft 130, specifically to the portion that projects outwards of the motor body 160.

This toothed pinion 210 can be set to mesh with a gear wheel 215, preferably a gear wheel with inner teeth, which can be advantageously positioned in a space that, relative to the direction defined by the axis Y of the drive shaft 130, is between the motor body 160 and the tool 135.

The toothed pinion 210 and the gear wheel 215 can be made of plastic material and preferably with low friction coefficient, in order not to need particular lubrication.

The gear wheel 215, which can have a greater primitive diameter than that of the toothed pinion 210, can in turn be coaxially and securely fastened to an output shaft 220.

The output shaft 220 can be fastened and rotatably supported inside the casing 195, for example by a pair of bearings, so that its axis is parallel to the axis Y of the drive shaft 130, for example coinciding with the axis of rotation A of the tool 135.

While the toothed pinion 210 and the gear wheel 215 are preferably contained inside the casing 195, the drive shaft 220 can partially project outside the casing 195, so that it can be directly engaged to the tool 135.

For example, the drive shaft 220 can project through a lower wall 225 of the casing 195, which can be substantially flat and can directly face the tool 135.

The tool 135 can be engaged to the projecting portion of the output shaft 220 in a demountable manner, for example to allow its replacement in case of malfunction or for other reasons.

The tool 135 can also be partially surrounded by a cover 230, which is fixed to the casing 195, preferably in the part oriented towards the handle 115 and the grip 120, to protect the user from grass clippings or from other objects that could lifted and projected backwards by the tool 135 during operation.

Returning to the casing 195, this component is preferably provided with one or more inlet openings 235 and one or more outlet openings 240, which are adapted to put the internal volume of the casing 195 in communication with the exterior, thereby enabling an air flow to traverse the casing 195 and to cool the motor 125.

For example, the inlet opening(s) 235 can be realised in a wall of the casing 195 which is positioned above and substantially facing the cover 230, so as to contrast the possibility that grass clippings or other contaminants can enter into the casing 195.

To improve this contrasting action, each inlet opening 235 can be aligned to a corresponding rear wall, positioned inside the casing 195 at a short distance from the inlet opening 235, which hinders the entry of solid objects but without preventing the entry of air.

Additionally or alternatively, one or more inlet openings (not shown) can be obtained in the upper part of the casing 195, substantially oriented upwards.

Regarding the outlet opening(s) 240, these openings can preferably face the tool 135 directly, relative to the direction defined by the axis of rotation A, so as to be substantially oriented downwards and hence towards the ground.

For example, the inlet opening(s) 235 can be obtained in the lower wall 225 of the casing 195, where they can be arranged around the projecting segment of the drive shaft 220.

The casing 195 is also preferably provided with a plurality of separating walls adapted to define, inside the casing 195, a predetermined path for the air that flows from the inlet opening(s) 235 towards the outlet opening(s) 240.

In particular, this path (indicated by the arrows in FIG. 3) is selected so that the air flow, flowing from the inlet opening 235 towards the outlet openings 240, is able to lap, traverse or otherwise pass in a condition of heat exchange with the motor 125.

For example, in the illustrated embodiment, the internal separating walls are shaped and arranged so that the air, entering from the inlet opening(s) 235, is guided to flow towards the inlet ports 180 of the motor body 160, preferably preventing it at the same time from flowing directly towards the outlet opening(s) 240.

In this way, all (or nearly all) of the entering air is forced to traverse the motor body 160, rising back in the direction of the axis Y of the drive shaft 130 and cooling the rotor 140 and the stator 145 as described above, before exiting radially from the outlet ports 185.

The internal separating walls of the casing 195 are then shaped and arranged in such a way as to define a conveying conduit that collects the air exiting the outlet ports 185 of the motor body 160 and guides them towards the outlet opening(s) 240, preferably passing through the space in which the transmission 205 is contained.

In this way, the warm air that exits the outlet openings 240 is projected downwards and hence towards the ground, being of little inconvenience for users and at the same time blowing away any grass clippings or other contaminants that otherwise could enter the casing 195, fouling and hampering the operation of the transmission 205.

The air flow described above is generated with the aid of the fan 190 (whose presence is, however, not essential), as well as by an additional fan 245 that is kinematically connected to the drive shaft 130 so as to be driven thereby.

The fan 245 is positioned outside the motor body 160 but it is contained inside the casing 195, in a space that, relative to the direction defined by the axis Y of the drive shaft 130, is between the motor body 160 and the tool 135.

In this way, the fan 245 is substantially positioned below the motor 125 and above the tool 135.

The fan 245 can be an axial fan and it can be adapted to rotate around an axis of rotation that is parallel to the axis of rotation A of the tool 135, for example coinciding therewith.

Relative to the direction defined by its own axis of rotation, the fan 245 also preferably faces the outlet opening(s) 240 of the casing 195, so as to thrust the air directly outwards and hence towards the tool 135.

In more detail, the fan 245 can be kinematically connected to the drive shaft 130 through the same transmission 205 that connects the drive shaft 130 to the tool 135.

For example, the fan 245 can be coaxially and securely fixed to the output shaft 220, preferably interposed in the axial direction between the gear wheel 215 and the tool 135, so as not to interfere with the drive shaft 130 and with the toothed pinion 210.

The fan 245 can also have an outer diameter equal to or smaller than the outer diameter of the gear wheel 215, so that the latter does not hamper the air flow and that all of the air drawn in, or at least most of it, passing to the centre of the gear wheel 215, is effectively guided towards the fan 245.

In accordance with a preferred embodiment, the fan 245 and the gear wheel 215 can be realised as a single assembly that can be mounted and demounted as a whole relative to the drive shaft 220 of the transmission 205.

For example, said assembly can comprise a central hub 250 adapted to be coaxially fixed on the drive shaft 220 of the transmission 205, and a lateral jacket 255, having substantially cylindrical shape, which coaxially surrounds the central hub 250.

The central hub 250 is joined to the lateral jacket 255 by a plurality of blades 260 that extend radially from one to the other, thereby defining the fan 245.

In particular, the fans 260 are able to connect the central hub 250 to a first annular portion of the lateral jacket 255, which also comprises a second annular portion, positioned coaxially to the first and having for example a greater inner diameter, which can extend axially towards the motor 125 and whose inner surface bears the teeth that define the gear wheel 215.

Thanks to this solution, the blades 260 of the fan 245 also serve as support arms for the gear wheel 215.

The central hub 250, the lateral jacket 255 and the blades 260 can be realised as a single monolithic body, for example made of plastic material and obtained by injection moulding, which thereby defines both the gear wheel 215 and the fan 245.

Obviously, a person versed in the art may make numerous changes of a technical and applicative nature to the work tool 100, without thereby departing from the scope of the invention as claimed below.

The invention claimed is:

1. A work tool (100) comprising:
 a motor (125) provided with a drive shaft (130),
 a casing (195) containing the motor (125) and provided with at least one inlet opening (235) and with at least one outlet opening (240),
 a tool (135) positioned outside the casing (195) and kinematically connected to the drive shaft (130),
 a fan (245) kinematically connected to the drive shaft (130) and adapted to generate an air current from the inlet opening (235) towards the outlet opening (240) of the casing (195) passing in heat exchange relationship with the motor (125), and
 a transmission (205) adapted to connect kinematically the drive shaft (130) to the tool (135), which comprises a toothed pinion (210) coaxially fixed to the drive shaft (130) and a gear wheel (215) coaxially fixed to an output shaft (220) and set to mesh with said toothed pinion (210),
 wherein said fan (245) is contained inside the casing (195) in a space located between the motor (125) and the tool (135) and is coaxially fixed to the output shaft (220) of the transmission (205), and the gear wheel (215) is a gear wheel with inner teeth realized in a single body with the fan (245).

2. The work tool (100) according to claim 1, wherein the fan (245) is an axial fan.

3. The work tool (100) according to claim 1, wherein the outlet opening (240) of the casing (195) faces the tool (135).

4. The work tool (100) according to claim 1, wherein the fan (245) is axially interposed between the gear wheel (215) of the transmission (205) and the tool (135).

5. The work tool (100) according to claim 1, wherein the motor (125) is an electric motor comprising a rotor (140) coaxially fixed to the drive shaft (125), a stator (145) and a motor body (160) containing the rotor (140) and the stator (145), said motor body (160) comprising at least one inlet port (180) and at least one outlet port (185) for the air flow generated by the fan (245), which are positioned at opposite sides of the stator (145) along the direction defined by the drive shaft (130).

6. The work tool (100) according to claim 5, wherein said inlet port (180) is realized on a head (170) of the motor body (160) oriented towards the tool (135), whereas the outlet port (185) is obtained on a lateral wall (165) of the motor body (160).

7. The work tool (100) according to claim 5, wherein the motor (125) comprises an auxiliary fan (190) positioned inside the motor body (160) and coaxially fixed to the drive shaft (130).

8. The work tool (100) according to claim 7, wherein the auxiliary fan (190) is a centrifugal fan radially facing the outlet port (185) of the motor body (160).

9. The work tool (100) according to claim 7, wherein the auxiliary fan (190) is axially interposed between the rotor (140) and a commutator (150) also contained inside the motor body (160).

* * * * *